United States Patent [19]

Hagen et al.

[11] 3,919,188
[45] Nov. 11, 1975

[54] MONOAZO DYES OF THE BENZISOTHIAZOLE SERIES WHICH ARE NOT SOLUBLE IN WATER

[75] Inventors: Helmut Hagen, Frankenthal; Guenter Hansen, Ludwigshafen, both of Germany

[73] Assignee: Badische Anilin- & Soda-Fabrik Aktiengesellschaft, Ludwigshafen (Rhine), Germany

[22] Filed: Sept. 23, 1970

[21] Appl. No.: 74,915

[30] Foreign Application Priority Data
Sept. 27, 1969 Germany............................ 1948996
June 3, 1970 Germany............................ 2027201

[52] U.S. Cl................................ 260/158; 260/304
[51] Int. Cl.² C09B 29/08; C09B 29/26; D06P 3/54

[58] Field of Search.................................. 260/158

[56] References Cited
UNITED STATES PATENTS
3,455,898  7/1969  Seefelder et al............... 260/158
3,573,273  3/1971  Seefelder et al............... 260/158

*Primary Examiner*—Floyd D. Higel
*Attorney, Agent, or Firm*—Johnston, Keil, Thompson & Shurtleff

[57] ABSTRACT

Monoazo dyes having a diazo component derived from a 4-amino-7-nitro-1,2-benzisothiazole optionally substituted in the 5-position by chlorine, bromine, nitro or cyano and a substituted aniline as coupling component. The dyes are eminently suitable for dyeing synthetic linear polyesters.

3 Claims, No Drawings

MONOAZO DYES OF THE BENZISOTHIAZOLE SERIES WHICH ARE NOT SOLUBLE IN WATER

The invention relates to new and valuable monoazo dyes having the general formula (I):

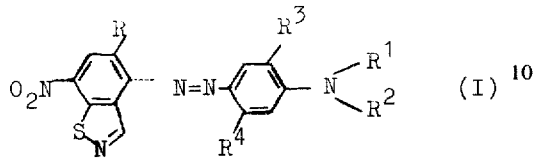

in which R denotes hydrogen, chlorine, bromine, cyano or nitro; $R^1$ denotes hydrogen or unsubstituted or substituted alkyl or aralkyl; $R^2$ denotes unsubstituted or substituted alkyl, cycloalkyl, aralkyl or aryl; $R^3$ denotes hydrogen, methoxy or ethoxy; and $R^4$ denotes hydrogen, chlorine, methyl, acetylamino, chloroacetylamino, hydroxyacetylamino or propionylamino.

Radicals $R^1$ include for example (besides hydrogen) methyl, ethyl, n-propyl, isopropyl, n-butyl, isobutyl, β-hydroxyethyl, β-cyanoethyl, β-acetoxyethyl, β-carbomethoxy, β-carboethoxy, β-methoxyethyl, β-ethoxyethyl, β-chloroethyl, β-(β'-cyanoethoxy)-ethyl, β-acetylethyl, β-phenoxyacetoxyethyl, methylsulfonyloxyethyl, β-(β'-acetylacetoxy)-ethyl, β-hydroxypropyl, γhydroxypropyl, β, γ-dihydroxypropyl, γ-acetylaminopropyl, benzyl and phenylethyl.

$R^2$ may denote any of the radicals specified for $R^1$ and also cyclohexyl, phenyl, ethoxyphenyl and methoxyphenyl.

Dyes having the general formula (Ia):

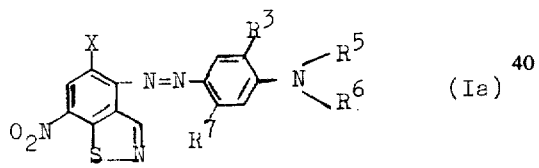

in which X denotes hydrogen, chlorine, bromine or cyano; $R^5$ denotes alkyl having one to four carbon atoms or β-hydroxyethyl, β-cyanoethyl, β-acetoxyethyl, β-methoxyethyl, β-carbomethoxyethyl, β-carboethoxyethyl, β-(β'-acetylacetoxy)-ethyl, β-(β'-acetylacetoxy)-propyl, β,γ-dihydroxypropyl, benzyl or phenylethyl; $R^6$ denotes alkyl having one to four carbon atoms or β-hydroxyethyl, β-cyanoethyl, β-acetoxyethyl, cyclohexyl or phenoxyethyl; $R^7$ denotes hydrogen, chlorine, methyl or acetylamino; and $R^3$ had the meanings given above, are of particular industrial importance.

The new dyes are suitable for dyeing synthetic linear polyesters such as polyethylene glycol terephthalate, or compounds having a similar constitution. They have high tinctorial strength and give Bordeaux red to blue dyeings having excellent fastness properties. The carrier method and the high temperature method are suitable dyeing methods.

For the production of dyes having the formula (I), diazo compounds of amines having the general formula (II):

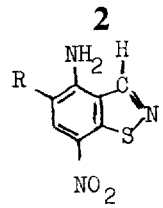

are reacted with coupling components having the general formula (III):

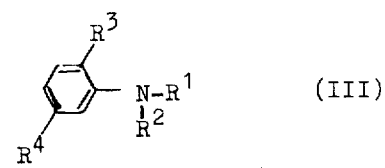

in which R denotes hydrogen, chlorine, bromine or nitro and $R^1$, $R^2$, $R^3$ and $R^4$ have the meanings given above.

For the production of dyes having the formula (I) in which R denotes cyano, diazo compounds having the general formula (II):

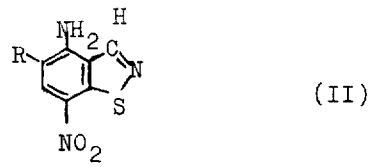

in which R denotes chlorine or bromine are reacted with coupling components having the general formula (III):

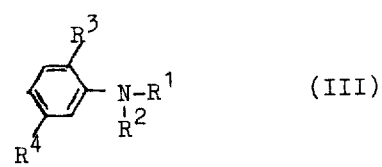

in which $R^1$, $R^2$, $R^3$ and $R^4$ have the above meanings and the chlorine or preferably bromine in the coupling product is exchanged for CN.

Examples of compounds having the formula (II) are: 4-amino-7-nitro-1,2-benzisothiazole, 4-amino-5-chlor-7-nitro-1,2-benzisothiazole, 4-amino-5-bromo-7-nitro-1,2-benzisothiazole and 4-amino-5,7-dinitro-1,2-benzisothiazole.
They are accessible by the following method:
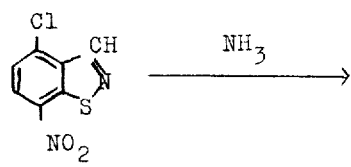 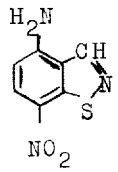 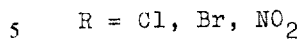 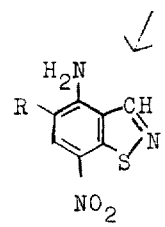
$R = Cl, Br, NO_2$
4-halo-7-nitro-1,2-benzisothiazoles may be obtained from the 4-halo compound by nitration. The 4-halo compounds are known from Swiss Pat. No. 484,932.
Examples of compounds having the formula (III) include:
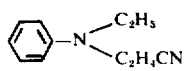 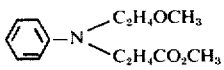 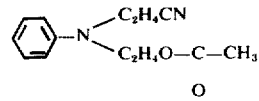
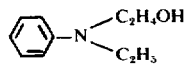 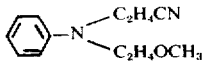 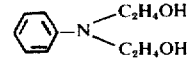
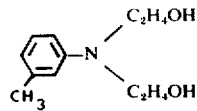 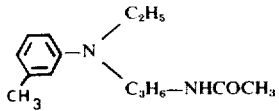 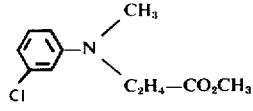
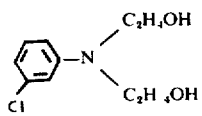 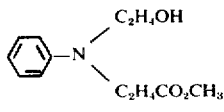 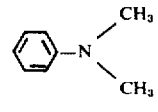
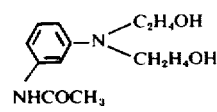 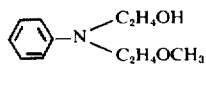 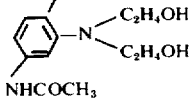
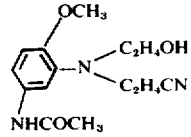 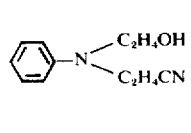 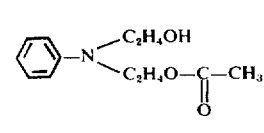
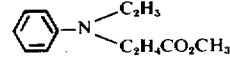 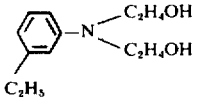 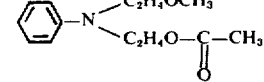
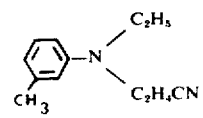 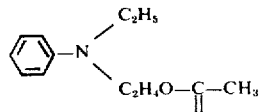 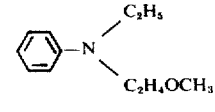
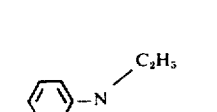 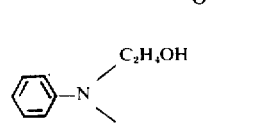 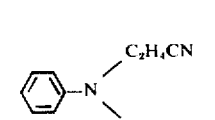
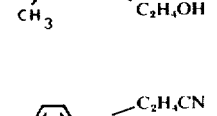 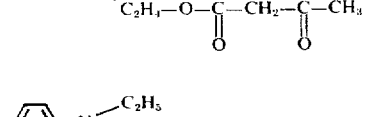 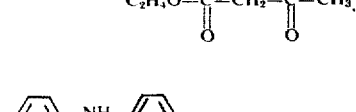
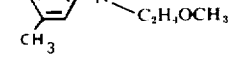  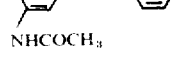

-continued

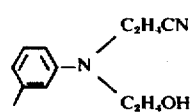 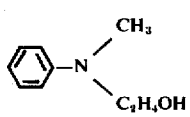 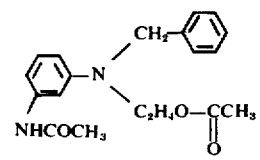

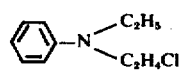 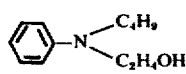 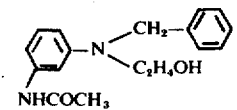

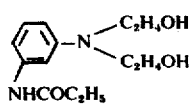 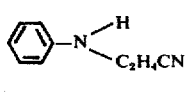 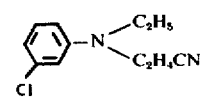

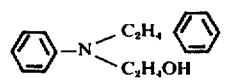 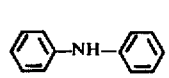 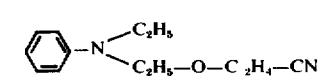

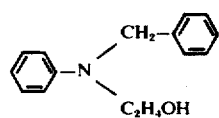 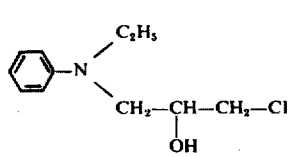 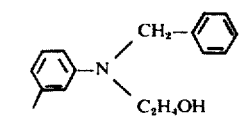

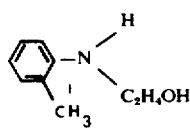 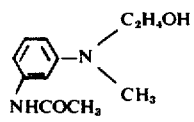 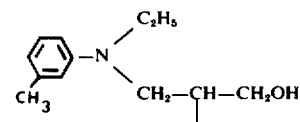

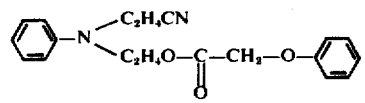 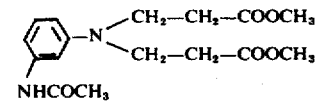 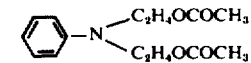

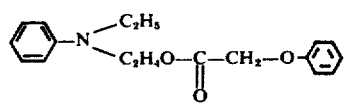 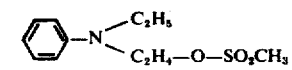 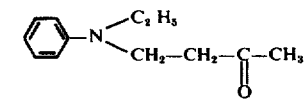

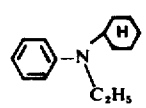 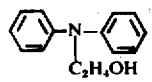 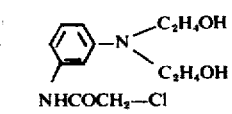 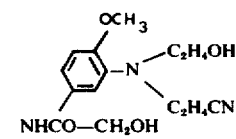

The diazotization of the compounds having the formula (II) and coupling with the compounds having the formula (III) may be carried out by generally known methods. The coupling may take place in aqueous medium with or without solvents such as alcohols (methanol or ethanol), glycols (diethylene glycol) or amides (dimethylformamide or N-methylpyrrolidone).

Exchange of the substituents R (Cl or Br) for the cyano groups is advantageously carried out by reaction of the coupling product with cuprous cyanide (or another cuprous compound mixed with an alkali metal cyanide) in an organic solvent at elevated temperature.

Examples of suitable solvents are aromatic unsubstituted or substituted hydrocarbons such as xylene, chlorobenzene or dichlorobenzene; alcohols, glycols and glycol ethers such as butanol, diethylene glycol, diethylene glycol monomethyl ether or diethylene glycol monobutyl ether; pyridine bases such as pyridine, picoline or quinoline; and also acetonitrile, dimethylaniline, dimethylformamide, N-methylpyrrolidone, butyrolactone and dimethylsulfoxide. Pyridine and dimethylsulfoxide and mixtures of these solvents with one another or with other solvents are particularly suitable.

Convenient reaction temperatures are in the range from 40° to 150°C, preferably from 80° to 120°C.

The duration of the reaction depends on the constitution of the dye; as a rule it amounts to a few hours. The course of the reaction may be followed for example by thin-layer chromatography.

To isolate the dyes having the formula (I) with R denoting CN, the copper salt present in the reaction mixture may be complexed, e.g. by an alkali metal cyanide. The dye is then suction filtered. The dye may also be dissolved in a solvent (for example acetone) in which the copper salt is not soluble and thus freed from the copper salt.

The invention is illustrated by the following Examples. The parts and percentages in the Examples are by weight.

EXAMPLE 1

23 Parts of 4-amino-7-nitro-1,2-benzoisothiazole is dispersed in 200 parts of water and 19 parts of bromine is added while stirring. The mixture is stirred first for one hour at room temperature and then for another two hours at 50°C. After cooling, the product is diluted with 500 parts of water and the precipitate is suction filtered, washed with water and dried in vacuo. 27 parts of 4-amino-5-bromo-7-nitro-1,2-benzoisothiazole having a melting point of 324°C is obtained. The yield is equivalent to 85% of the theory.

13.7 Parts of 4-amino-5-bromo-7-nitro-1,2-benzoisothiazole is dissolved at 10° to 15°C in 100 parts of 96% sulfuric acid. 30 parts of a mixture (17:3) of glacial acetic acid and propionic acid is then gradually added at 0° to 5°C to the solution and diazotization is carried out at 0° to 5°C by dripping in 16.5 parts of nitrosylsulfuric acid (11.5% of $N_2O_3$). The whole is stirred for 3 hours at 0° to 5°C and the diazo solution is allowed to flow into a solution of 8.7 parts of N-β-cyanoethyl-N-ethylaniline, 25 parts of water, 10 parts of 36% hydrochloric acid, 1 part of sulfamic acid, 500 parts of ice and 500 parts of water. After stirring overnight, the deposited crystalline dye is suction filtered, washed with water until neutral and dried at 50°C at subatmospheric pressure. A blue black powder is obtained which in finely divided form dyes polyethylene glycol terephthalate intense violet shades having very good fastness properties.

When the coupling components given in the following Table are used instead of the coupling component in Example 1, dyes having similar fastness properties are obtained:

| Example No. | Coupling component | Shade of dyeing on polyester |
|---|---|---|
| 2 | phenyl-N(C$_2$H$_4$OH)(C$_2$H$_5$) | navy blue |
| 3 | phenyl-N(C$_2$H$_4$OH)(C$_2$H$_4$CN) | violet |
| 4 | 3-Cl-phenyl-N(C$_2$H$_4$OH)(C$_2$H$_4$OH) | blue |
| 5 | 3-Cl-phenyl-N(C$_2$H$_4$OH)(C$_2$H$_4$OH) | violet |
| 6 | 3-NHCOCH$_3$-phenyl-N(C$_2$H$_4$OH)(C$_2$H$_4$OH) | blue |
| 7 | 2-OC$_2$H$_5$, 5-NHCOCH$_3$-phenyl-N(C$_2$H$_4$OH)(C$_2$H$_4$CN) | greenish blue |
| 8 | phenyl-N(C$_2$H$_5$)(C$_2$H$_4$CO$_2$CH$_3$) | violet |
| 9 | phenyl-N(C$_2$H$_5$)(C$_2$H$_4$CN) | violet |
| 10 | phenyl-N(C$_2$H$_4$OCH$_3$)(C$_2$H$_4$CO$_2$CH$_3$) | violet |
| 11 | phenyl-N(C$_2$H$_4$CN)(C$_2$H$_4$OCH$_3$) | violet |
| 12 | 3-CH$_3$-phenyl-N(C$_2$H$_5$)(C$_3$H$_6$NHCOCH$_3$) | blue |
| 13 | phenyl-N(C$_2$H$_4$OCH$_3$)(C$_2$H$_4$O-CO-CH$_3$) | violet |
| 14 | phenyl-N(C$_2$H$_4$OH)(C$_2$H$_4$CO$_2$CH$_3$) | navy blue |
| 15 | phenyl-N(C$_2$H$_4$OH)(C$_2$H$_4$OCH$_3$) | navy blue |
| 16 | phenyl-N(C$_2$H$_5$)(C$_2$H$_4$O-CO-CH$_3$) | violet |
| 17 | phenyl-N(C$_2$H$_4$CN)(C$_2$H$_4$O-CO-CH$_3$) | red violet |
| 18 | phenyl-N(C$_2$H$_4$OH)(C$_2$H$_4$OH) | navy blue |
| 19 | phenyl-N(CH$_3$)(CH$_3$) | navy blue |

-continued

| Example No. | Coupling component | Shade of dyeing on polyester |
|---|---|---|
| 20 | 2-OCH$_3$, 5-NHCOCH$_3$ aniline with N(C$_2$H$_4$OH)(C$_2$H$_4$OH) | blue green |
| 21 | aniline with N(C$_2$H$_4$OH)(C$_2$H$_4$O—COCH$_3$) | violet |
| 22 | aniline with N(C$_2$H$_5$)(C$_2$H$_4$OCH$_3$) | navy blue |
| 23 | 3-CH$_3$ aniline with N(C$_2$H$_5$)(C$_2$H$_4$OH) | navy blue |
| 24 | 3-CH$_3$ aniline with N(C$_2$H$_4$CN)(C$_2$H$_4$OCH$_3$) | violet |
| 25 | 3-CH$_3$ aniline with N(C$_2$H$_4$CN)(C$_2$H$_4$OH) | violet |
| 26 | aniline with N(C$_2$H$_5$)(C$_2$H$_4$Cl) | violet |

EXAMPLE 27

53 Parts of 4-chloro-7-nitro-1,2-benzoisothiazole (melting point 154°C) is dissolved in 250 parts of dimethylsulfoxide and then 20 parts of gaseous ammonia is passed in at 25° to 30°C. The temperature rises to 40°C. The reaction mixture is stirred for another hour at from 35° to 40°C, two-thirds of the solvent is distilled off at subatmospheric pressure and the residue is poured into 400 parts of ice-water. The deposited yellow solid is suction filtered, washed with 100 parts of methanol and dried. 47 parts of 4-amino-7-nitro-1,2-benzoisothiazole having a melting point of 325°C is obtained. This is a yield of 96% of the theory.

9.75 Parts of 4-amino-7-nitro-1,2-benzoisothiazole is dissolved in 70 parts of 36% hydrochloric acid while stirring for 30 minutes, then 100 parts of ice is added and whild cooling externally 15 parts of a 23% sodium nitrite solution is dripped in. The whole is stirred for 1 hour at 0° to 5°C, a slight excess of nitrite is removed with sulfamic acid and the diazo solution is filtered into a solution of 11.85 parts of N-β-carbomethoxyethyl-N-β-methoxyethylaniline, 25 parts of water, 8 parts of a 36% hydrochloric acid and 100 parts of ice. The coupling mixture then has 250 parts of a 20% sodium acetate solution added to it and the whole is stirred for another 2 hours. The deposited crystalline dye is suction filtered, washed with water until neutral and dried at 50°C at subatmospheric pressure. A deep colored blue black powder is obtained which in finely divided form dyes polyethylene glycol terephthalate in very fast red violet shades.

Similar dyes are obtained with the coupling components specified in the following Table:

| Example No. | Coupling component | Shade of dyeing on polyester |
|---|---|---|
| 28 | aniline with N(C$_2$H$_4$CN)(C$_2$H$_4$OCH$_3$) | Bordeaux |
| 29 | 3-CH$_3$ aniline with N(C$_2$H$_5$)(C$_3$H$_6$NHCOCH$_3$) | violet |
| 30 | aniline with N(C$_2$H$_4$OCH$_3$)(C$_2$H$_4$OCOCH$_3$) | currant |
| 31 | aniline with N(C$_2$H$_4$OH)(C$_2$H$_4$CO$_2$CH$_3$) | currant |
| 32 | aniline with N(C$_2$H$_4$OH)(C$_2$H$_4$OCH$_3$) | currant |
| 33 | aniline with N(C$_2$H$_4$CN)(H) | Bordeaux |
| 34 | aniline with N(C$_2$H$_5$)(C$_2$H$_4$OCOCH$_3$) | currant |
| 35 | aniline with N(C$_2$H$_5$)(C$_2$H$_4$OCH$_3$) | currant |
| 36 | aniline with N(C$_4$H$_9$)(C$_2$H$_4$OH) | violet |
| 37 | 3-CH$_3$ aniline with N(C$_2$H$_4$CN)(C$_2$H$_4$OCH$_3$) | red violet |
| 38 | 3-CH$_3$ aniline with N(C$_2$H$_4$CN)(C$_2$H$_4$OH) | currant |
| 39 | aniline with N(C$_2$H$_5$)(C$_2$H$_4$Cl) | red violet |
| 40 | aniline with N(CH$_3$)(C$_2$H$_4$CO$_2$CH$_3$) | currant |
| 41 | 2-OCH$_3$, 5-NHCOCH$_3$ aniline with N(C$_2$H$_4$OH)(C$_2$H$_4$OH) | blue |
| 42 | aniline with N(C$_2$H$_4$OH)(C$_2$H$_4$OCCH$_3$) | red violet |

EXAMPLE 43

146 Parts of 4-amino-7-nitro-1,2-benzoisothiazole is dissolved at 0° to 10°C in 660 parts of concentrated sulfuric acid. At 0° to 5°C, 105 parts of nitrating acid (52% by weight of $HNO_3$ and 48% by weight of $H_2SO_4$) is added thereto in the course of 2 hours. Then the whole is stirred for another hour, the temperature rising to 20°C. The mixture is poured onto 1500 parts of ice and the precipitate is suction filtered, washed with water and dried. 49 parts of 4-amino-5,7-dinitro-1,2-benzoisothiazole is obtained having a melting point of 275° to 277°C. The yield is 27% of the theory.

12.0 Parts of 4-amino-5,7-dinitro-1,2-benzoisothiazole is dissolved at 10° to 15°C in 100 parts of 96% sulfuric acid. Then at 0° to 5°C, 50 parts of a mixture (17:3) of glacial acetic acid and propionic acid is dripped in and thereafter 16.5 parts of nitrosylsulfuric acid (11.5%) at 0° to 5°C. The whole is stirred at this temperature for 3 hours and the diazo solution is allowed to flow into a solution of 8.7 parts of N-β-cyanoethyl-N-ethylaniline, 25 parts of water, 7 parts of 36% hydrochloric acid, 1 part of sulfamic acid, 500 parts of ice and 500 parts of water.

After stirring overnight, the crystalline dye is suction filtered, washed with water until neutral and dried at 50°C at subatmospheric pressure. It dyes polyester fabric fast blue violet shades.

EXAMPLE 44

195 Parts of 4-amino-7-nitro-1,2-benzoisothiazole is finely dispersed in 1200 parts of water and then 270 parts of chlorine is passed in during 4 hours at 50°C. The whole is stirred for another five hours at room temperature. The precipitate is suction filtered, washed with water and dried in vacuo. 202 parts of 4-amino-5-chloro-7-nitro-1,2-benzoisothiazole is obtained having a melting point of 276° to 278°C. This is a yield of 92% of the theory.

11.5 Parts of 4-amino-5-chloro-7-nitro-1,2-benzoisothiazole is dissolved at 10° to 15°C in 100 parts of 96% sulfuric acid, at 0° to 5°C 50 parts of a mixture (17:3) of glacial acetic acid and propionic acid is added and diazotization is carried out with 16.5 parts of nitrosylsulfuric acid (11.2% of $N_2O_3$) at 0° to 5°C. The mixture is stirred for another 3 hours at 0° to 5°C and then coupled with a solution of 8.7 parts of N-β-cyanoethyl-N-ethylaniline, 25 parts of water, 7 parts of 36% hydrochloric acid, 1 part of sulfamic acid, 1000 parts of ice and 500 parts of water. The whole is allowed to stand overnight and the crystalline dye is then suction filtered, washed until neutral and dried at 50°C at subatmospheric pressure. A blue black powder is obtained which in finely divided form dyes polyethylene glycol terephthalate in red violet shades having high fastness to light.

Similar dyes which dye polyesters in the shades indicated are obtained with the same diazo component and the coupling components specified in the following Table.

| Example No. | Coupling component | Shade of dyeing on polyester |
|---|---|---|
| 45 | Ph–N(C$_2$H$_5$)(CH$_2$CH$_2$CH$_2$OH) | navy blue |
| 46 | Ph–N(C$_2$H$_4$OH)(C$_2$H$_4$CN) | red violet |
| 47 | 3-CH$_3$-Ph–N(C$_2$H$_4$OH)(C$_2$H$_4$OH) | navy blue |
| 48 | 3-Cl-Ph–N(C$_2$H$_4$OH)(C$_2$H$_4$OH) | violet |
| 49 | 3-NHCOCH$_3$-Ph–N(C$_2$H$_4$OH)(C$_2$H$_4$OH) | blue |
| 50 | 2-OCH$_3$-5-NHCOCH$_3$-Ph–N(C$_2$H$_4$OH)(C$_2$H$_4$CN) | blue |
| 51 | Ph–N(C$_2$H$_5$)(C$_2$H$_4$CO$_2$CH$_3$) | violet |
| 52 | 3-CH$_3$-Ph–N(C$_2$H$_5$)(C$_2$H$_4$CN) | currant |
| 53 | Ph–N(C$_2$H$_4$OCH$_3$)(C$_2$H$_4$CO$_2$CH$_3$) | currant |
| 54 | Ph–N(C$_2$H$_4$CN)(C$_2$H$_4$OCH$_3$) | currant |
| 55 | 3-CH$_3$-Ph–N(C$_2$H$_5$)(C$_3$H$_6$NHCOCH$_3$) | navy blue |
| 56 | Ph–N(C$_2$H$_4$OCH$_3$)(C$_2$H$_4$OCOCH$_3$) | currant |
| 57 | Ph–N(C$_2$H$_4$OH)(C$_2$H$_4$CO$_2$C$_2$H$_5$) | currant |
| 58 | Ph–N(C$_2$H$_4$OH)(C$_2$H$_4$OCH$_3$) | violet |
| 59 | Ph–N(C$_2$H$_5$)(C$_2$H$_5$OCOC$_2$H$_5$) | currant |

-continued

| Example No. | Coupling component | Shade of dyeing on polyester |
|---|---|---|
| 60 | Ph-N(C₂H₄CN)(C₂H₄OCOCH₃) | Bordeaux |
| 61 | Ph-N(C₂H₄OH)(C₂H₄OH) | violet |
| 62 | Ph-N(C₂H₅)(C₂H₄OC₂H₅) | violet |
| 63 | 3-CH₃-C₆H₄-N(C₂H₅)(CH₂CH(OH)CH₃) | navy blue |
| 64 | 3-CH₃-C₆H₄-N(C₂H₄CN)(C₂H₄OCH₃) | red violet |
| 65 | 3-CH₃-C₆H₄-N(C₂H₄CN)(C₂H₄OH) | currant |
| 66 | Ph-N(C₂H₅)(C₂H₄Cl) | violet |
| 67 | 3-CH₃-C₆H₄-N(CH₃)(C₂H₄CO₂C₄H₉) | currant |
| 68 | 2-OCH₃-5-CH₃-C₆H₃-N(CH₃)(CH₃) | violet |
| 69 | 2-OCH₃-5-CH₃-C₆H₃-N(C₂H₄OH)(C₂H₄OH) | blue |
| 70 | 4-NHCOCH₃-C₆H₄-N(C₂H₄OH)(C₂H₄OCOCH₃) | violet |

Similar dyes are obtained with the diazo component having the formula:

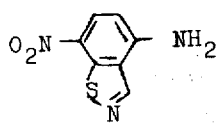

and the following coupling components:

| Example No. | Coupling component | Shade of dyeing on polyester |
|---|---|---|
| 71 | Ph-N(C₂H₄-Ph)(C₂H₄OH) | currant |
| 72 | Ph-N(CH₂-Ph)(C₂H₄OH) | red violet |
| 73 | 3-CH₃-C₆H₄-N(CH₂-Ph)(C₂H₄OH) | violet |
| 74 | 3-CH₃-C₆H₄-N(C₂H₅)(CH₂CH(OH)CH₂OH) | navy blue |
| 75 | Ph-N(C₂H₄O-COCH₃)(C₂H₄O-COCH₃) | Bordeaux |
| 76 | Ph-N(H)(C₂H₄OH) | Bordeaux |
| 77 | Ph-N(C₂H₅)(C₂H₅) | violet |
| 78 | Ph-N(C₃H₇)(C₂H₄OH) | violet |
| 79 | Ph-N(C₄H₉)(C₂H₄OH) | violet |
| 80 | Ph-NH-Ph | red violet |
| 81 | Ph-N(H)(C₂H₄OH) | blue |

EXAMPLE 82

13.7 Parts of 4-amino-5-bromo-7-nitro-1,2-benzoisothiazole is dissolved at 10° to 15°C in 100 parts of 96% sulfuric acid. 30 Parts of a mixture (17:3) of glacial acetic acid and propionic acid is then gradually added to the solution at 0° to 5°C and diazotization is carried out at 0° to 5°C by dripping in 16.5 parts of nitrosylsulfuric acid (11.5% N₂O₃). The whole is stirred for another three hours at 0° to 5°C and the diazo solution is allowed to flow into a solution of 8.7 parts of N-β-cyanoethyl-N-ethylaniline, 25 parts of water, 10 parts of 36% hydrochlorid acid, 1 part of sulfamic acid, 500 parts of ice and 500 parts of water. After stirring overnight, the deposited crystalline dye is suction filtered, washed with water until neutral and dried under subatmospheric pressure at 50°C.

11.48 parts (0.025 mole) of 5-bromo-7-nitro-1,2-benzoisothiazolyl-4-azo-p-(N-β-cyanoethyl-N-ethyl)-aniline is dissolved in 60 parts of dimethylsulfoxide, 4.5 parts of cuprous cyanide is added and the whole is stirred for 2 hours at 80°C. The course of the cyanidation may be followed chromatographically. When the reaction is over, the mixture is cooled and diluted with 400 parts of acetone and the copper salts are filtered off. The filtrate has the acetone distilled off and is poured into 1000 parts of water. The precipitate is suction filtered and dried. 8.3 parts of 5-cyano-7-nitro-1,2-benzoisothiazolyl-4-azo-p-(N-β-cyanoethyl-N-ethyl)-aniline is obtained. The dye gives fast navy blue deyings on polyester cloth.

After introducing the cyano group, dyes having similar fastness properties are obtained by using the coupling components given in the following Table instead of the coupling components of Example 82.

| Example No. | Coupling component | Shade of dyeing on polyester |
|---|---|---|
| 83 | ⌬—N(C₂H₄OH)(C₂H₅) | blue |
| 84 | ⌬—N(C₂H₄OH)(C₂H₄CN) | navy blue |
| 85 | ⌬(CH₃)—N(C₂H₄OH)(C₂H₄OH) | blue |
| 86 | ⌬(Cl)—N(C₂H₄OH)(C₂H₄OH) | blue violet |
| 87 | ⌬(NHCOCH₃)—N(C₂H₄OH)(C₂H₄OH) | blue |
| 88 | ⌬(OC₂H₅)(NHCOCH₃)—N(C₂H₄OH)(C₂H₄CN) | greenish blue |
| 89 | ⌬—N(C₂H₅)(C₂H₄CO₂CH₃) | navy blue |
| 90 | ⌬—N(CH₂—CH(OH)—CH₃)(C₂H₄CN) | navy blue |
| 91 | ⌬—N(C₂H₄OCH₃)(C₂H₄CO₂CH₃) | navy blue |
| 92 | ⌬—N(C₂H₄CN)(C₂H₄OCH₃) | navy blue |
| 93 | ⌬(CH₃)—N(C₂H₅)(C₃H₆NHCOCH₃) | blue |
| 94 | ⌬—N(C₂H₄OCH₃)(C₂H₄O—C(O)—CH₃) | blue |

-continued
| Example No. | Coupling component | Shade of dyeing on polyester |
|---|---|---|
| 95 | 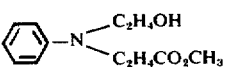 | blue |
| 96 | 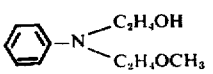 | blue |
| 97 | 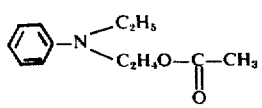 | navy blue |
| 98 | 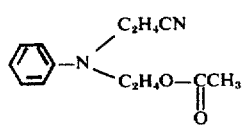 | blue violet |
| 99 | 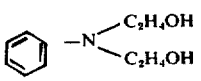 | blue |
| 100 | 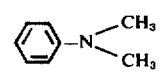 | navy blue |
| 101 | 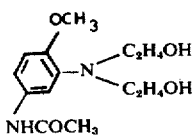 | blue green |
| 102 | 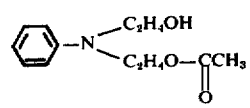 | blue |
| 103 | 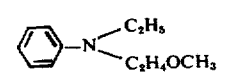 | navy blue |
| 104 | 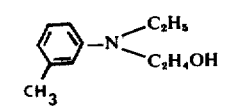 | navy blue |
| 105 | 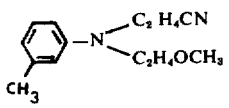 | blue violet |
| 106 | 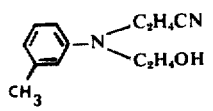 | navy blue |
| 107 | 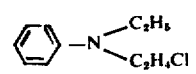 | navy blue |

| Example No. | Coupling component | Shade of dyeing on polyester |
|---|---|---|
| 108 | 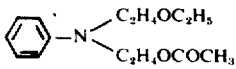 | blue |
| 109 | 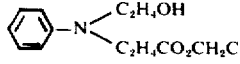 | blue |
| 110 | 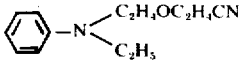 | blue violet |
| 111 | 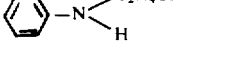 | violet |
| 112 | 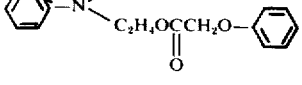 | navy blue |
| 113 | 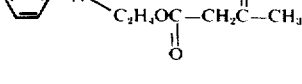 | blue violet |
| 114 | 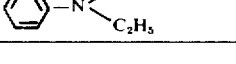 | blue violet |

EXAMPLE 115

11.5 Parts of 4-amino-5-chloro-7-nitro-1,2-benzoisothiazole is dissolved at 10° to 15°C in 100 parts of 96% sulfuric acid, 50 parts of a mixture (17:3) of glacial acetic acid and propionic acid is added at 0° to 5°C and diazotization is carried out with 16.5 parts of nitrosylsulfiric acid (11.2% of $N_2O_3$) at 0° to 5°C. The mixture is stirred for three hours at 0° to 5°C and then coupled with a solution of 7.6 parts of N-β-hydroxyethyl-N-ethylaniline, 25 parts of water, 7 parts of 36% hydrochloric acid, 1 part of sulfamic acid, 1000 parts of ice and 500 parts of water. The whold is stirred overnight and the crystalline dye is suction filtered, washed until neutral and dried at 50°C at subatmospheric pressure.

18.9 Parts (0.05 mole) of the 5-chloro-7-nitro-1,2-benzoisothiazolyl-4-azo-p-(N-β-hydroxyethyl-N-ethyl)-aniline is dissolved in 100 parts of pyridine, 10.6 parts of cuprous cyanide is added and the whole is stirred for 3 hours at 130°C. When the exchange is over (which can be ascertained by thin-layer chromatography) the reaction mixture is cooled, poured onto 1000 parts of water and suction filtered. The residue is digested with acetone and the suspension is filtered. After the acetone has been distilled off, the filtrate is diluted with water, the precipitate is suction filtered and dried at 50°C at subatmospheric pressure. 12.4 Parts of the dye containing cyano groups is obtained which dyes polyester fast navy blue shades.

By using the coupling components given in the following Table instead of the coupling component of Example 34, dyes having similar fastness properties are obtained after the introduction of the nitrile group.

| Example No. | Coupling component | Shade of dyeing on polyester |
|---|---|---|
| 116 | 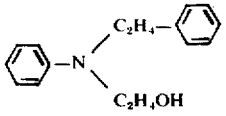 | navy blue |
| 117 | 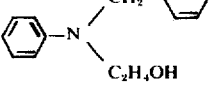 | navy blue |
| 118 | 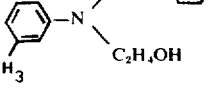 | blue |
| 119 | 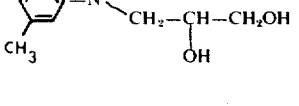 | blue |
| 120 | 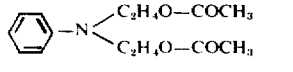 | blue violet |
| 121 | 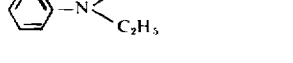 | navy blue |
| 122 | 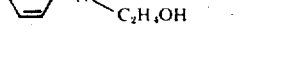 | navy blue |

| Example No. | Coupling component | Shade of dyeing on polyester |
|---|---|---|
| 123 | Ph-N(C₄H₉)(C₂H₄OH) | navy blue |
| 124 | Ph-NH-Ph | navy blue |
| 125 | Ph-NH-C₆H₄-OC₂H₅ | blue |
| 126 | Ph-NH-C₆H₁₁ | blue violet |
| 127 | Ph-N(C₂H₄OH)-C₆H₁₁ | navy blue |
| 128 | (NHCOCH₃)Ph-N(C₂H₄OH)-C₆H₁₁ | blue |
| 129 | (NHCOCH₃)Ph-NH-C₆H₁₁ | blue |
| 130 | (NHCOCH₃)Ph-NH-C₆H₄-OCH₃ | blue |
| 131 | (OCH₃)(NHCOCH₃)Ph-NH-C₆H₁₁ | greenish blue |
| 132 | Ph-N(CH₃)(C₂H₄OC₄H₉) | blue violet |
| 133 | Ph-N(C₂H₅)(C₂H₄OCOC₃H₇) | blue violet |
| 134 | Ph-N(C₂H₄CN)(C₂H₄OCOC₃H₇) | blue violet |
| 135 | Ph-N(C₂H₄CN)(C₂H₄OCOC₃H₅) | blue violet |
| 136 | Ph-N(C₂H₅)(C₃H₆OCOCH₂CH₃) | violet blue |
| 137 | Ph-N(C₂H₅)(CH₂-CH(OCOCH₃)-CH₃) | violet blue |
| 138 | Ph-N(C₂H₅)(CH₂-CH(CH₃)-OCOC₃H₇) | violet blue |
| 139 | (OCH₃)Ph-N(C₂H₅)(C₂H₅) | navy blue |
| 140 | (NHCOC₂H₅)Ph-N(C₂H₅)(C₂H₅) | blue |
| 141 | (NHCOCH₂Cl)Ph-N(C₂H₄CN)(C₂H₅) | navy blue |
| 142 | (NHCOCH₂OH)Ph-N(C₂H₄CN)(CH₃) | navy blue |

We claim:
1. A monoazo dye having the formula:

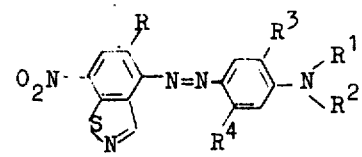

in which R denotes hydrogen, chlorine, bromine, cyano or nitro; $R^1$ denotes hydrogen, alkyl having one to four carbon atoms, benzyl; phenylethyl, hydroxyalkyl having two or three carbon atoms, β-methoxyethyl, β-ethoxyethyl, β-butoxyethyl, β-cyanoethyl, carboalkoxyethyl having a total of four to seven carbon atoms, β-chloroethyl, β-(β'-cyanoethoxy)-ethyl, β-acetylethyl, β-phenoxyacetoxyethyl, β-methylsulfonyloxyethyl, β-(β'-acetylacetoxy)-ethyl or γ-acetylaminopropyl; $R^2$ denotes alkyl having one to four carbon atoms, hydroxyalkyl having two to three carbon atoms, β-cyanoethyl, alkanoyloxyalkyl having four to six carbon atoms, phenyl, ethoxyphenyl, methoxyphenyl or cyclohexyl; $R^3$ denotes hydrogen, methoxy or ethoxy; and $R^4$ denotes hydrogen, chlorine, methyl, methoxy, ethoxy, acetylamino, propionylamino, chloroacetylamino or hydroxyacetylamino.

2. A monoazo dye having the formula:

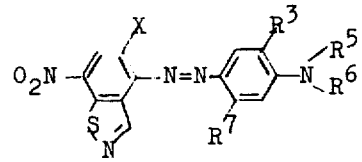

in which X denotes bromine or cyano; $R^5$ denotes alkyl having one to four carbon atoms; $R^6$ denotes alkyl having one to four carbon atoms; $R^7$ denotes hydrogen, chlorine, methyl or acetylamino; and $R^3$ denotes hydrogen, methoxy or ethoxy.
3. The dye having the formula:
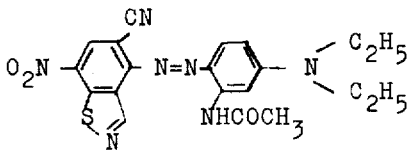
* * * * *